United States Patent
Richmond et al.

(10) Patent No.: US 11,928,240 B2
(45) Date of Patent: Mar. 12, 2024

(54) SECURE PERSONAL INFORMATION DATABASE

(71) Applicants: Greg Richmond, Cupertino, CA (US);
Bihama Vedaste, San Jose, CA (US);
Dean Hamilton, Cupertino, CA (US);
John Chiong, San Jose, CA (US)

(72) Inventors: Greg Richmond, Cupertino, CA (US);
Bihama Vedaste, San Jose, CA (US);
Dean Hamilton, Cupertino, CA (US);
John Chiong, San Jose, CA (US)

(*) Notice: Subject to any disclaimer, the term of this patent is extended or adjusted under 35 U.S.C. 154(b) by 269 days.

(21) Appl. No.: 17/588,165

(22) Filed: Jan. 28, 2022

(65) Prior Publication Data
US 2023/0244809 A1 Aug. 3, 2023

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01); *G06F 2221/2141* (2013.01)

(58) Field of Classification Search
CPC .............. G06F 21/6245; G06F 21/604; G06F 2221/2141; G06F 21/31; G06F 21/6218; G06F 21/33; G06F 2221/2107; H04L 63/0428; H04L 63/10; H04L 63/12; H04L 67/1097
See application file for complete search history.

(56) References Cited

U.S. PATENT DOCUMENTS

| | | | | |
|---|---|---|---|---|
| 8,498,941 B2* | 7/2013 | Felsher | ............... | G06F 21/6245 705/51 |
| 10,855,771 B1* | 12/2020 | Priestley | ............. | H04L 65/4038 |
| 2008/0208649 A1* | 8/2008 | Ficery | ............. | G06Q 10/06311 705/7.13 |
| 2016/0315944 A1* | 10/2016 | Li | ........................ | G06F 16/9535 |
| 2021/0241869 A1* | 8/2021 | Muse | ..................... | G06F 9/542 |
| 2022/0174056 A1* | 6/2022 | Kihara | .................... | G06F 21/41 |

* cited by examiner

*Primary Examiner* — Ali S Abyaneh

(57) ABSTRACT

The present invention provides a means for efficiently and securely collecting, storing, and sharing all types of personal, electronic information from, for and between individuals and business users using software that runs on multiple personal, business and cloud computing systems. The information of a primary user is stored in an encrypted relational database which associates the private data with private data fields needed by secondary users or various business users. Each entity is assigned one unique user identity to ensure consistency in data privacy and sharing. Attributes for data groups exist to define the secondary users and business users who the primary user has authorized for access to or master sourcing of certified data. Change lists, including conditions for implementation, are created to facilitate management, scheduling and distribution of changes. Collection, storage, and distribution of personal data is assisted by robotic process automation algorithms.

22 Claims, 4 Drawing Sheets

Example Device J Database Contents

Primary user ID ~201
Device ID ~202
All field names list ~203
All attributes table ~204
Field group names table ~205
Device cached data groups list ~206
Device primary user verification data sets ~207
Device change table ~208
Master summary table ~209
Share summary table ~210
Device cached field data table ~211

Figure 4

SECURE PERSONAL INFORMATION DATABASE

CROSS REFERENCES TO RELATED APPLICATIONS

This application claims the benefit of the U.S. Provisional Patent Application, Ser. No. 63/143,744, titled SECURE PERSONAL INFORMATION DATABASE and filed on Jan. 29, 2021, the content of which is hereby incorporated by reference herein in its entirety.

FIELD OF THE INVENTION

The present invention relates to a novel method for securely storing and mastering personal information in databases while providing access to multiple users, service providers, and applications as consumers of or authoritative contributors of the data, as authorized by the owner of the personal information.

BACKGROUND OF THE INVENTION

With the development of data capture, generation and storage by electronic means, users of this technology face the challenge of keeping their personal information private from the general public while still allowing authoritative, accurate, and timely access to certain portions of the data for use by other trusted users, trusted service providers, and trusted applications. Traditionally this has been accomplished by a data owner manually conveying data to an interested party or service provider who attempts to securely store only the information needed to provide the requested service to the user while securing that data from unauthorized access by any other entity. However, as the interface between the user and service providers transitions to electronic communications, for example through the internet, due to the convenience of communication, scheduling, and in some cases receipt of services or related service information, the electronic exchange of personal data renders the electronically stored and communicated private information vulnerable to unauthorized disclosure. In addition, the information from multiple service providers is often needed to transact business for providing a single service. Examples of such personal information types include but are not limited to both current and historical address, contact, credit, employment, familial, financial, health, legal, immigration, insurance, medical, travel, and purchase data. However, these varied types of information, for a single individual, are typically stored in separate databases without any way to ensure their accuracy or authoritativeness or intelligently combine them to automate business transactions or perform data analytics across information types. Compounding this problem is the fact that many transactions or services initiated by one individual require information from other individuals or authoritative data providers. Ensuring this information is current, accurate, authoritative and secure can be very difficult and time consuming.

Thus there exists a need to efficiently and securely author, store, authorize automated access to, and provide updates to overlapping subsets of all types of an individual's private information in order to automate business transactions, calculations or perform data analytics across information types. For example, purchasing real estate requires both current and historical address, employment, financial, and credit data plus current contact, familial, and insurance information among others. In another example, calculating annual taxes requires current and historical employment, familial, financial, immigration, purchase and historical tax information plus current address data. In another example, conducting health care research to correlate cause and effect relationships requires access to current and historical address, familial, health, insurance, medical, and travel information, among others. To automate these transactions, calculations and data analytics the required personal information across multiple data types from multiple authoritative sources and service providers must be securely identified, collected, certified, stored, and shared.

SUMMARY OF THE INVENTION

The present invention provides a means for efficiently and securely authoring, collecting, storing, and sharing all types of private, electronic information from, for and between individuals and business users using software that runs on personal, business and cloud computing systems. The private information of the primary user is stored in an encrypted, personal, highly relational datastore which associates the private data with data fields needed by secondary users or various business users. Each entity (an individual or business) is assigned one unique user identity to ensure consistency in data privacy, authoring and sharing. Each data field or group of data fields has an attribute identifying which entity is the authoritative source of that data which can only be changed by that entity and not the primary user to ensure data integrity. Each data field also has an associated list of entities who the primary user has authorized to have access to the associated data. The data sharing authorizations may allow entities having direct share access to indirectly share or forward the primary user's data with other entities. The data sharing authorizations may also be conditional where sharing only occurs after one or more data fields match predetermined values. The private information is collected by software that interfaces directly with the primary user or recognizes requests for private information as the primary user interacts with secondary users or business users. The software can also login as the primary user to their preferred business service provider electronic interfaces to gain access to the primary user's data and correctly associate the data with the correct data fields for storage and secure access. The software may also recognize when the same or similar data is being requested by entities and offers to automatically store or provide the requested data. When the primary user's data changes, authorized entities are updated either at the time data is requested or in the background to the entity's cloud or locally encrypted copy of data to reduce access latency. Secure access to and storage of the primary user's data is ensured through one or more of encryption, cryptographic key distribution, digital signature, data sharding, login credentials and multifactor authentication including but not limited to biometrics, temporal and geospatial location verification technologies.

BRIEF DESCRIPTION OF THE DRAWINGS

FIG. 4 shows example data fields in a primary user database.

DETAILED DESCRIPTION OF THE INVENTION

Figure 1:
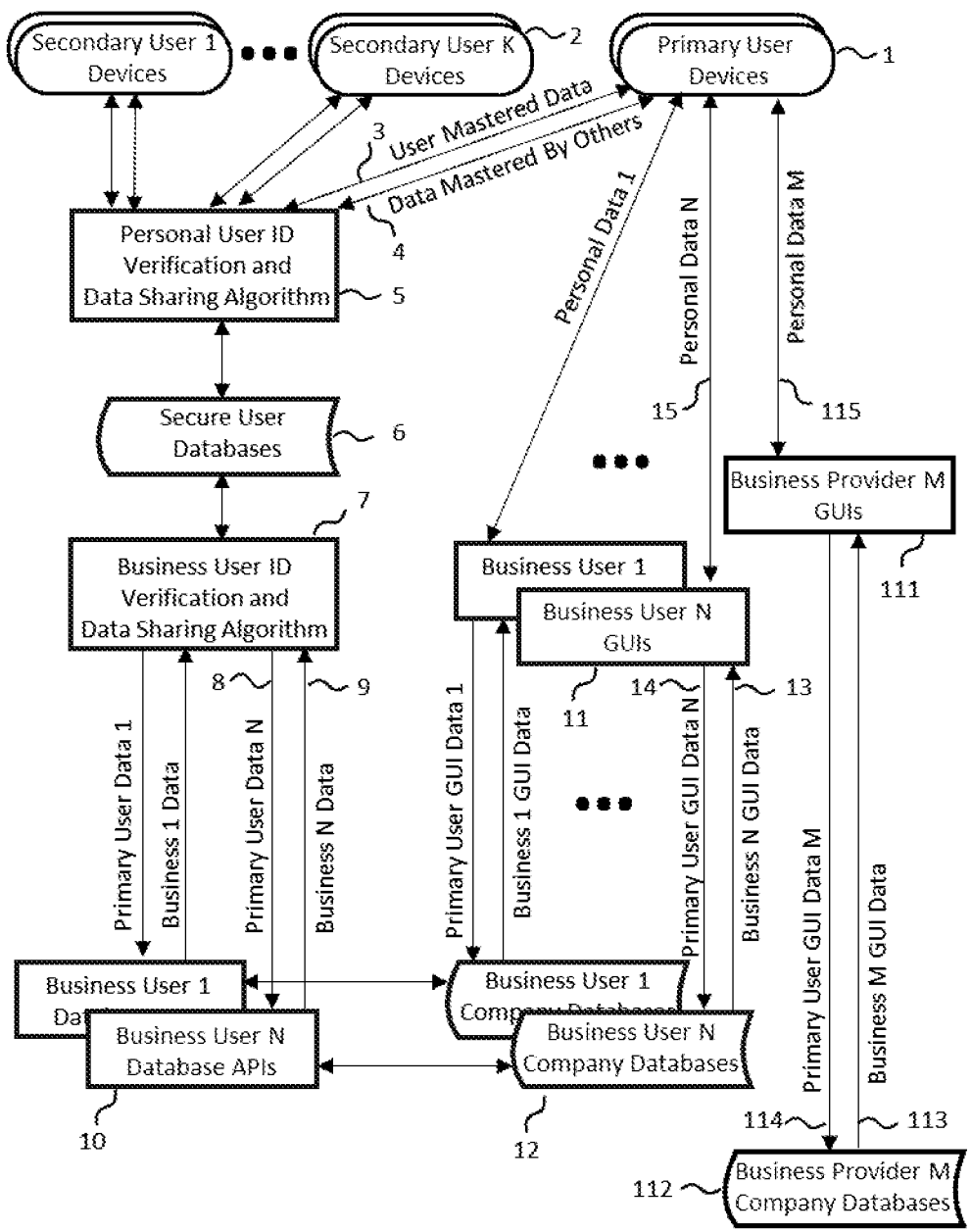
FIG. 1 shows a high-level diagram of the information flow between the primary user devices, one or more secondary users and their devices, one or more business users and their various application and user interfaces, one of many business providers and their various user interfaces and various secure databases containing the personal information of the primary user.

A description of the invention follows. Referring to FIG. 1, the present invention provides a means for efficiently and securely collecting, storing, and sharing all types of private, electronic information from, for and between individuals and businesses using software or a collection of software that runs on personal and business computing systems. The primary user will use one or more primary user devices 1 to provide, control access to, and review their personal information. Such user devices have data entry, display, compute, and storage capabilities and example devices include but are not limited to smart phones, tablets, laptops, and other computing devices. A primary user device executes the software which allows access to the primary user's secure master databases 6 only after the primary user's identity is securely confirmed by a personal user identification and data sharing algorithm 5. Although a single user identity allows access to the primary user's databases, the primary user may choose to create various personalities to simplify sharing subsets of their personal information. For example a primary user may have a 'work' personality, a 'family' personality, a 'club' personality, and other personalities. Once the primary user's identity is verified, the primary user can author, submit, retrieve, review, change, and authorize sharing of their user mastered data 3 and can also retrieve, review and authorize sharing of data mastered by others 4 that one or more secondary users, business users and business providers have been previously authorized by the primary user to share as masters of that data. Such data mastered by others 4 can be provided by a secondary user using one of their devices, such as one of secondary user K devices 2, running the software only after their identity and ability to share is confirmed by the personal user identity verification and sharing algorithm 5.

Although the patent narrative describes the data management system from a primary user's perspective, any secondary user or business user is also a primary user from their perspective and will have their own primary user database for secure storage and authorized receipt of and secure sharing of their personal information or information they author as a service to other users and business users. Note that a business user can either be for-profit or not-for-profit and when a for-profit business user is using the system as a primary user, their personal data would include information about the services and/or products they provide. Examples of such business personal information include but are not limited to: service and/or product specifications, manufacturing instructions, costs, sales prices, sales data, inventories, warranties, customer lists, etc. Portions of this data can be shared among employees, customers, subcontractors, and other business users, each of which would have their own unique user ID to facilitate consistent and accurate sharing of data. Employees of a business user may be identified by the employer identifier plus their role in the company to facilitate transition of company data, data mastering and sharing authorizations of that employee position to a different employee taking on that role.

The data mastered by others 4 can also be provided by business users using one of their business user Application Programming Interfaces (APIs) 10 designed to interact directly with the primary user's database. Such data mastered by others 4 can be provided only after the business user's identity and ability to share is confirmed by the business user identity verification and data sharing algorithm 7 and the primary user and business user have agreed that the business user will master the data or forward data mastered by others. Either the user or business user can request that a subset of the business user generated data 9 be mastered data by allowing only the business user to authoritatively initiate and make changes to the data or forwarding data mastered by others and shared with the business user. Such requests must be approved by the entity responding to the request and the approvals are managed by the business user ID verification and data sharing algorithm 7 which also ensures subsequent changes to the mastered data subset are made only by the originating entity. The unique ID of each business user allows the primary user to share certain groups of primary user data 8 only with that business user and for the business user to share only certain groups of service data 9 associated with the primary user.

In some cases, the data mastered by others 4 includes requests by secondary users or business users to access the primary user's data or to provide data associated with the primary user. The primary user can then review these requests and either reject or authorize the sharing of the data associated with these requests and the newly shared data will be stored either in existing previously unused database fields or newly created database fields.

The private information of the primary user is efficiently stored in encrypted relational databases 6 which associate the private data values with data fields for access by the primary user and any combination of one or more authorized secondary users and authorized business users. The private data values may include the actual encrypted data or the location information for encrypted data, including data values, electronic files or images ensuring all types of private information can be stored securely. In some cases, the locations can refer to alternate secure databases to avoid duplicating the secure storage or to support data sharding for increased security where personal data is stored in multiple databases located across one or more storage devices. Each data field or group of data fields has an associated list of secondary users and business users who the primary user has authorized to have access to the associated data field or fields. As mentioned previously, the primary user authorizes the access either in response to a request from a secondary user or business user, or by offering such access and waiting for the secondary user or business user to accept the sharing request. The relation between the data field value and the data field name allows the data value to be identified and appropriately used by the secondary users or business users.

In some cases, the business users have their own Graphical User Interfaces, GUIs, designed to interact with users either directly or through internet browser interfaces. Such business user GUIs 11 may ask for personal data 15 or provide information 13 associated with the user which becomes part of the exchanged personal data 15. Either the user or business user can request that all or subsets of the business generated data 13 be authoritatively mastered by allowing only the originating entity to make changes to that data. Algorithms running on the primary user devices can monitor the exchanged login and personal data 15 to ensure proper business user ID verification and data sharing. Any GUI interfaces not supported in this way are not allowed to exchange data into the primary user's secure databases 6. The business user can store the business GUI data 13 generated by the business user and the GUI collected user data 14 in their own company databases 12 that they manage. The private information exchanged through such interaction is collected by software running on the primary user devices 1 that recognizes requests for private information as the primary user interacts with other users or business users and offers to store the information in the primary user's secure database after it is entered into the software GUI requesting the information. Methods used to recognize the prompts for or values of the information being entered and to automatically associate the entered data values with the correct data fields in the relational database include but are not limited to direct match between form field identifiers and database field names, field name lookup tables, matching entered data values to their corresponding database field values, and/or artificial intelligence.

In some cases, the business provider, for example business provider M 112, is not a user of the system but still interacts with the primary user through business provider M GUI software 111. Algorithms running on the primary user devices can still monitor the exchanged login and personal data 115 to ensure proper primary user and business provider ID verification and data sharing including secure mastering of the primary user's data by the business provider. The business provider can store the business M GUI data 113 generated by the business provider and the GUI collected user data 114 in their own company databases 112 that they manage. The execution of the business provider M GUI software 111 can be initiated manually or automatically by the system software running on a primary user device to access the primary user's business M GUI data 113. Such interaction typically requires the business provider GUI Uniform Resource Locator, URL, the primary user's user name and password to login to the business providers GUI through the internet.

Once the primary user's data is collected and securely stored in the secure user databases 6, the personal user data sharing algorithm 5 will recognize any changes to data values that the primary user has authorized for sharing and then replicate those changes to the secure user databases 6 associated with authorized secondary users and/or business users. The secondary user devices 2 may have a locally encrypted copy of the secondary user data which will be automatically updated when their software application that is used to access the primary user's data requests the information from the primary user's database. Alternatively, these updates can be made in the background to the locally encrypted copy of the secondary user's or business user's database to reduce access latency.

The sharing of the primary user's data with other secondary users or business users can be done so that the secondary users or business users are notified not to share the primary user's data with any other users and if any additional sharing is attempted through the software system, the system will prevent additional sharing. Alternatively, the primary user's data may be indirectly shared by forwarding it to other secondary users or business users wherein the system will require the entity wishing to pass along the shared information to first request the primary user's authorization to do so. The system can also allow the primary user to authorize sharing of the data up to a certain number of preauthorized indirect shares or indirect share levels. Additional indirect shares are those in which the secondary user or business user can share the primary user's data to one or more additional secondary users or business users but those additional users cannot further share the data. Additional indirect shares to a lower level are those in which the secondary user or business user can share to one or more additional secondary users or business users who can then share the primary user's data with other secondary users or business users. Such additional preauthorized indirect shares can continue to propagate to multiple levels, wherein the limit for the number of lower levels can also be preauthorized. The system software may keep a record of all entities to which the primary user's data has been shared and the path for sharing of that data.

All of the direct and indirect sharing of one or more of the primary user's data groups may be tracked by the system so that the primary user can review to whom the data groups have been shared and then authorize additional direct or indirect sharing at any level or revoke the authorization for sharing to one or more entities to which the data has been shared. Such capability is useful in supporting mandated control of personal data sharing such as is specified in the European General Data Protection Regulation (GDPR) requirements.

Each data field also has an associated list of secondary users and business users who the primary user has authorized to have access to the associated data. Sometimes an authorized user desires to further share data received from a primary user with another secondary or business user partner. In such cases, the authorized user can request next level sharing authorization from the primary user to do so. The actual syndication of the data to the authorized user's partner can be accomplished by the authorized user receiving a secure, one-time, proxy authorization code which can be shared with the authorized user's partner. That partner can use the authorization code to directly access the specific data that the primary user has allowed the authorized user to share with the partner. At any time, either the primary user or the authorized user can terminate the proxy authorization and any authorized users downstream from the secondary user will have their direct access to updated information revoked. The primary user can also request or require any downstream users to remove previously authorized data from their local datastores. If data is required to be removed, then the system will do so automatically the next time a secondary user or downstream user connects to the internet.

Figure 2:
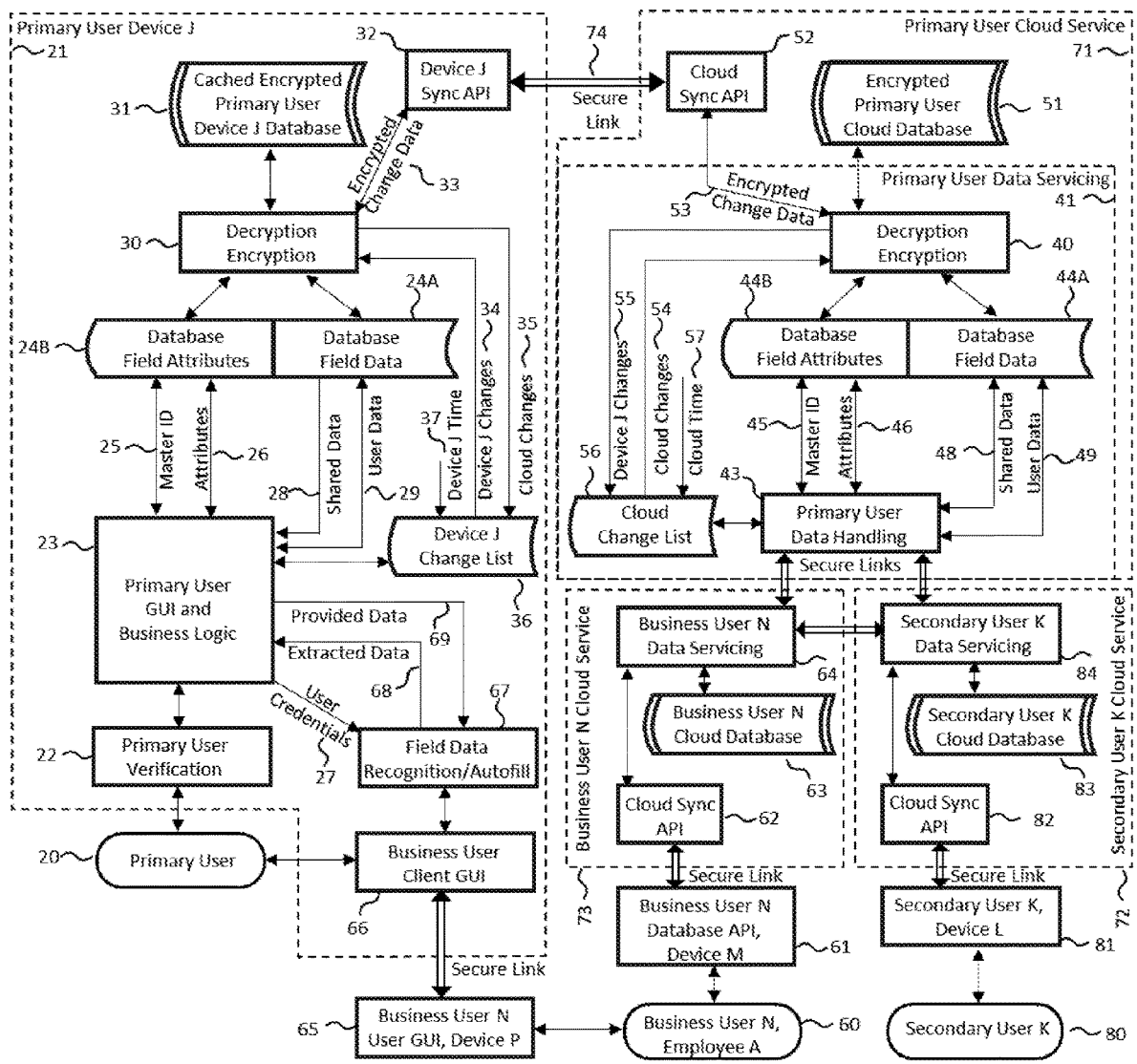
FIG. 2 shows a more detailed diagram of the flow and control of the primary user's data between one of the primary user's devices, one of a secondary user's devices, a business user's GUI to the user, and a business user's API to the primary user's database, including associated security, authorization, and synchronization of changes to the primary user's personal data.

Referring to FIG. 2, we see a more detailed view of the interactions between the primary user 20, one of several secondary users, herein identified as secondary user K, 80, and one of several business users, hereinafter identified as business user N 60. The primary user 20 is using their device J 21; the secondary user is using their device L 81; and one of many business user employees, hereinafter identified as employee A 60, is using device M 61 to interface with the primary user's cloud database 51 through business user N's database API and employee A 60 can also use the same device M 61 or an alternate device P 65 as shown, to optionally interface with the primary user's device J database 31 through business user N's user GUI. The business user GUI's and API's can be designed to run autonomously without the need for any employee to interact and be exposed to the primary user's personal data. However, in cases where one or more employees or employee positions have access to the primary user's personal data, recognizing the specific employee or employee position, such as employee A, as a direct business user is beneficial to the business user organization. This is because the business user organization is responsible for enforcing data privacy rules and regulations such as the European General Data Protection Regulation (GDPR) and needs to maintain accurate records of who has access to the data. That data access can be granted or revoked by the primary user or business user to specific employees or employee positions of the organization and records of those changes will be maintained in the primary user's cloud database.

It should be noted that the encrypted primary user cloud database 51 is an aggregated superset of all primary user device databases and that any particular device database, such as device J cached database 31, can contain all or a subset of the data in the cloud database 51. Restricting the device J cached database to a smaller subset of the overall primary user's personal information held in the cloud improves security since the primary user's personal devices such as device J are more susceptible to theft or data breaches. In addition, the data storage capabilities of the primary user devices may be limited and reducing the amount of encrypted database information that is stored on the user devices frees up the limited memory space for other uses.

Continuing to refer to FIG. 2 and within the dashed outline of Primary user Device J 21, the primary user 20 can interact with their locally stored and encrypted database 30 through the primary user GUI and business logic 23 after their identity is confirmed by the primary user verification routine 22. The primary user verification consists of one or more of the following verification steps: matching of a password entered by the primary user; matching of one or more biometric patterns unique to the primary user such as fingerprints, external facial parameters, internal eye parameters, voice parameters, permanent artificial markings such as tattoos, etc.; matching of a unique code sent to one or more of the primary user's personal devices or other devices authorized by the primary user, including email to computing devices and email, text messages or phone calls to cell phones; the user's two dimensional or three dimensional geographic location with or without time of day limits; etc. The verification parameter values that may be required for matching are stored in the primary user's encrypted database 31 and can be decrypted by the decryption algorithm 30 for momentary storage in a database data field within the unencrypted database field data 24A for comparison. Alternatively, if the verification parameter values that are entered for verification during each access by the primary user are always exactly identical, they can be encrypted using the same method used to encrypt the comparison or 'golden' pattern and the encrypted patterns then compared to avoid decryption of the 'golden' comparison pattern thus enhancing security. Prior to entry and storage of the 'golden' identity verification patterns, the user may be required to provide alternate identification information such as but not limited to photos or real time video of themselves, photo ID's such as a driver's license or passport, a birth certificate, or other identification documents or to require certification by other users or identification services such as but not limited to online notary services.

Once the primary user's identity is verified, the primary user can interact with the primary user GUI to initiate one or more of the following: provide, view and change data they are authorized to change, view data originated or authoritatively 'mastered' by other user's and business users, approve data share requests from other secondary users and business users, and initiate data share requests to other users and business users to share data mastered by others. One or more data fields are organized into data groups. Each data group can be a subset of or overlap with another data group. The data field names and values belonging to a data group can be defined by the primary user, a business user, or software algorithms to simplify the association between groups of data fields and their associated authoritative data masters and authorized sharing. The data group definitions are stored in the primary user's encrypted database. The data group names are recalled by the primary user GUI and business logic 23 for the primary user to select various data groups for viewing and are downloaded from the encrypted primary user device J database 31 and decrypted by decryption algorithm 30 prior to viewing. Field data 24A that the primary user is authorized to change will be so indicated when the master ID 25 stored in the database field attributes 24B specifically associated with the subset of field data 24A matches the primary user's ID. Example types of field attributes 24B include but are not limited to: data field name, master ID, cached location address, master location address, allocated data size, master's authorization to share, time the data field was last verified, time the data field was last changed, and time the authorization field was last changed. One or more of these field attributes 24B will be changed when the user updates the field data 24A.

Methods the primary user can use to enter data they master include but are not limited to typing, speech recognition, file attachment, camera image capture, scanned images, download from local storage or the internet, form recognition, text recognition, etc.

One of the field attributes 24B is the cached location address which is unique to the device J database 31 that is stored or cached on the primary user device J 21. In one embodiment of the invention, all field attributes of the locally cached encrypted database are decrypted without decrypting the actual data fields associated with them. The cached location address is then used to decrypt the locally cached encrypted data only when access to that unencrypted data is required. This enhances security by leaving most of the data encrypted at any one time and only decrypting data the primary user needs access to for the operation being performed.

Another field attribute 24B may be the master's authorization to share. This is one of the attributes 26 read and written by the primary user GUI and business logic 23. The master's authorization to share is needed, for example, when business user N is the authoritative master of the primary user's credit card number which the primary user wishes to share with another user or business user. Another example would be when the primary user wishes to share user K's contact information as an emergency contact, but the master of that data is user K who must give permission to share their personal data.

It is useful to understand for the following discussions that in one embodiment of the present invention, the algorithms performed within the dashed line of the primary user master cloud service 71 are substantially the same as the algorithms performed within the dashed lines of the secondary user K master cloud service 72 and the business user N master cloud service 73, the primary difference being the actual attributes and data processed and stored within their respective databases. These master cloud devices can be separate physical computing and storage devices, or separate computing and storage partitions within the same cloud computing device, or shared computing resources operating sequentially. The components contained within the dashed line of the primary user data servicing algorithm 41 are substantially duplicated within the solid lines of the secondary user K data servicing algorithm 64 and the business user N data servicing algorithm 84, but the individual components are not duplicated in the diagram for simplicity.

Note that the different cloud computing services, 71, 72, and 73, can execute in the same or different computing servers and storage devices either stand alone or in the same data center rack, in separate data center racks or in separate datacenters that are geographically separated from the primary user's master cloud service 71. If they are separate cloud devices, the communication between the primary user's data servicing algorithm 41 and the secondary user's data servicing algorithm 84 and the business user N's data servicing algorithm 64 will be done over secure communication links. Even when all three data servicing algorithms 41, 84, and 64 are within the same computational device, the communication between them may still be done using secure data communication techniques to enhance security.

The cloud sync API 52 for the primary user, the cloud sync API 82 for secondary user K, and the cloud sync API 62 for business user N can be the same API when all of them are executed by the same cloud computing device, or they may reside as separate copies of the API when executed on separate computing devices. In each case, while establishing a secure link with a separate device, whether that device be a primary user device such as user device J 21, or a secondary user K device such as device L 81, or a business user N device such as device M 61, the cloud sync API is able to verify the identity of the user or business user requesting establishment of a secure link and after establishing the secure link, route the encrypted data to the appropriate data servicing algorithm. Note that the identity verification method within the cloud sync APIs can use one or more of the same steps used by the primary user verification routine 22 with the exception that the matching patterns or multifactor verification devices would be different.

In one embodiment of the present invention, the sharing of a data group by the primary user that is not mastered by the primary user, must be approved by the master of the data. In such cases, the primary user's request to share will first be logged into a primary user device change list, for example device J change list 36, which will be encrypted by the encryption algorithm 30 and securely shared with the primary user cloud database through a secure link 74 established by the device J sync API 32 and the cloud sync API 52. The primary user data handling algorithm 43 will first verify that the primary user is still authorized by the master to share the data group. The data handling algorithm 43 will then request that the data master, for example secondary user K, request that the business user, for example business user N, to which the data will be shared first accept the data sharing offer and then the primary user data handling algorithm 43 will ensure that the business user N cloud database 63 either already has that data group or will request business user N data handling routine to create the data group manually or authorize automatic creation of the data group and associated attribute fields in business user N's cloud database. Once the data group is available for population, the primary user data servicing routing 41 will acquire the data mastered be user K through user K's data servicing routine 84 and make it available to the business user N data servicing routing 64 which will then store the data in business user N's cloud database with the appropriate master ID, time stamp, and other field attributes. As mentioned previously, this transaction can occur within the same cloud computing device or through secure links to other cloud computing devices.

Any changes to the primary user's field data 24A or field attributes 24B are recorded by the primary user GUI and business logic 23 into a Device J change list 36. The primary user GUI and business logic 23 is able to read and write user data 29 mastered by the primary user, but may only read shared data 28 that is mastered by other users or business users. When the primary user changes the user data 29 mastered by the primary user, the new data value and the time of change based on device J time 37 are recorded in the device J change list 36. The device J changes from the device J change list that the user is authorized to make are encrypted by the encryption algorithm 30 before being stored as part of the encrypted primary user device J database 31. The encrypted device J change lists 34 may remain in the primary user device J sync API 32 until the primary user device J is connected by a secure data link 74 to the master cloud service 71. Such secure data links may include but are not limited to one or more secure technologies such as: Secure Socket Layer, SSL; Transport Layer Security, TLS, including Elliptic Curve Cryptography, ECC, Digital Signature Algorithm, DSA, and RSA certificates; and Hyper Text Transfer Protocol Secure ethernet. When the primary user device J sync API 32 establishes the secure link 74 with the cloud sync API 52 running on the master cloud service 71, they will exchange encrypted device J change lists 36 and encrypted cloud change lists 56. The cloud change list 56 is the accumulation of cloud changes 54 made through the primary user data handling routine 43 that are timestamped by the cloud time 57. These change lists include the identity of the fields that have changed and change list 36 is a subset of the entire primary user device J database 31 and change lists 56 are subsets of the entire primary user cloud database 51 which includes encrypted values for all of the primary user's relational database field attributes 44B and field data 44A. As mentioned previously, the encrypted primary user database 51 residing in the cloud is the superset of all the primary user's data. The device J encrypted change data 33 and the encrypted cloud change data 53 are used by the primary user device J 21 decryption algorithm 30 and the master cloud service 71 decryption algorithm 40 respectively to identify which primary user device J database 31 and primary user cloud database 51 items are to be recalled and decrypted. This prevents decryption of the entire database thereby enhancing security.

Continuing to refer to FIG. 2, the impending device J database changes originating from the cloud, hereinafter referred to as cloud changes 35 are compared against the device J changes originated by the primary user as stored in the device J change list 36 to determine if there are any conflicting database field attribute or data changes. Similarly, the device J changes 55 are compared against the cloud changes as stored in the cloud change list 56. For example, the primary user may have previously logged into their financial services using a device other than device J and updated their financial information. That updated information may have been communicated to the cloud and the primary user's cloud database updated. At some time later, the primary user may have used device J to login to their financial services to update the financial data on device J. When device J is allowed to sync with the cloud database there will be two different financial data updates for the same shared data field 48. These conflicts can be automatically resolved based on which timestamp is most recent or the conflicting information including timestamps provided to the user for manual resolution before updating the user data 29 and 49 and associated attributes 26 and 46. All changes to either the primary user database are subject to the unique identifier of the change originator matching the authoritative master identifier attribute 25 and 45 for the data field being changed. The cloud change list 56 is updated with all dominant device J changes and each cloud change item is retained until all primary user devices have had that change synchronized to them. Once all primary user devices have synchronized to a change item, that change item can be deleted from the cloud change list or a time limit may be established so that if a primary user device has not been synced within that time limit, those unsynced changes are dropped from the change list. If the unsynced primary user device is later connected for sync, then a scan of the entire primary user's cashed device database and comparison to the cloud database will be required to determine which data fields and attributes need to change in the user device expecting sync.

Alternatively, all changes made during a prescribed period, including the period of all time since the establishment of the primary user's unique ID and database, can be retained to assist in tracking or auditing of the primary user's personal information change history. Such retained information is useful in tracking authorized disclosure of data, for example compiling a list of all users who have or once did have access to a certain group of data. It can also be useful in tracing unauthorized disclosure of data, for example correlating the timing of one or more data values having unauthorized disclosure to the timing of a specific authorized sharing event. Such unauthorized disclosure would occur outside of the data sharing algorithms described herein, for example through manual copying and alternate communication means than those described here.

Note that sharing of data can include portions of the associated attributes. For example, if a portion of the financial data is shared with business user N, that financial data can also include attribute data such as the master ID and the latest timestamp of the financial information among other types of shared attribute data.

The changes as summarized in the change lists, such as the device J change list 36, can also be made conditional on data values within a database, such as the primary user database 31, so that the changes become effective only after those conditions are met. An example use case for this conditional capability is when a primary user is no longer able to manage their personal data due to mental incapacity or death. Prior to such an event occurring, the primary user can specify that access to and/or master control of their personal data will change based on certain data fields within their personal data matching certain predetermined data values. For example, the user could establish one or more "MentallyFitN" or "DeceasedN" fields mastered by one or more other users or business users such that when one or more other users or business users all agree or that a predetermined percentage agree that the primary user is mentally incapacitated or deceased, access to and control of certain personal data becomes available to other users or business users. For example, control of financial accounts can be transferred to other users or access to various documents, such as a last will and testament, can be shared with other users or business users. Many other conditional examples can be thought of including when a user reaches a certain age, or is located within certain geographical boundaries, etc.

It should be obvious to one skilled in the art that although FIG. 2 is drawn to show a traditional table based relational database, alternate database architectures are also possible and may be preferred based on minimizing storage space, access latency and computational effort. Examples of alternative database architectures include graph databases.

Referring back to the bottom of FIG. 2, the secondary user K's device L 81 will contain the same computational algorithms and data storage as the primary user's device J 21. This allows the secondary user K 80 to be a primary user while the primary user 20 is treated as a secondary user. Both users 20 and 80 can interact with one or more business users such as business user N and specifically business user N employee A, 60. Note that while tracking business user N data access down to the employee level is recommended to maintain records of which employees have access to which data, it is possible for a business user to provide access to the business user database to multiple users if the business user N ID and ID verification data are shared to multiple employees.

To facilitate collection of the primary user's personal data, there can be a field data recognition and autofill software algorithm 67 that monitors the primary user's interactions with the business user. This is typically done as the primary user communicates with the business user N through one or more Graphical User Interfaces, GUI's, communicating through the primary user's internet connection. These business user client GUI's 66 allow the user to enter various types of data including personal data. The field data recognition and autofill algorithm will monitor the data being entered into the GUI data fields and using GUI field name matching to database field names either exactly, through lookup tables, through the data values being entered matching preexisting data within the primary user's database, or through other means recognize the relationship between the GUI field name and the database field name and offer to automatically store the extracted data 68 in existing or new primary user database data fields or to autofill the GUI data fields with provided data 69 from the primary user's database.

To facilitate population of the primary user's database, the field data recognition and autofill software 67 running on the primary user devices J 21 can be provided the primary user's login credentials 27 to login as the primary user to their preferred business user data base GUI 65 to access or request a data dump of the primary user's data and using pre-coded associations based on known database ordering or formats or using calculated associations through artificial intelligence or other means, the software application will correctly associate the extracted data values 68 with the correct primary user data base field data 24A. This type of software algorithm is commonly referred to as Robotic Process Automation, RPA, robots which are capable of mimicking many—if not all—human user actions. RPA robots can log into applications, move files and folders, copy and paste data, fill in forms, and extract structured and semi-structured data from documents and files. The RPA software can also recognize when the same or similar forms are being filled out either through a match or near match of the form URL or recognition of the form field prompts either by table lookup or artificial intelligence algorithms or other means. When a form is recognized by the RPA software as being identical or similar to a form previously completed by the primary user, the data values can be automatically filled out where the user may have the option to change the values before submitting them.

To facilitate new development of or modification to existing software applications that need access to the primary user's information, a list of field names and associated descriptions can be made publicly or privately available along with software that can refer to a business user's look-up table unique to the business user to facilitate automatic bidirectional conversion of the relational database data field names to the associated data names used by the business users.

Figure 3:
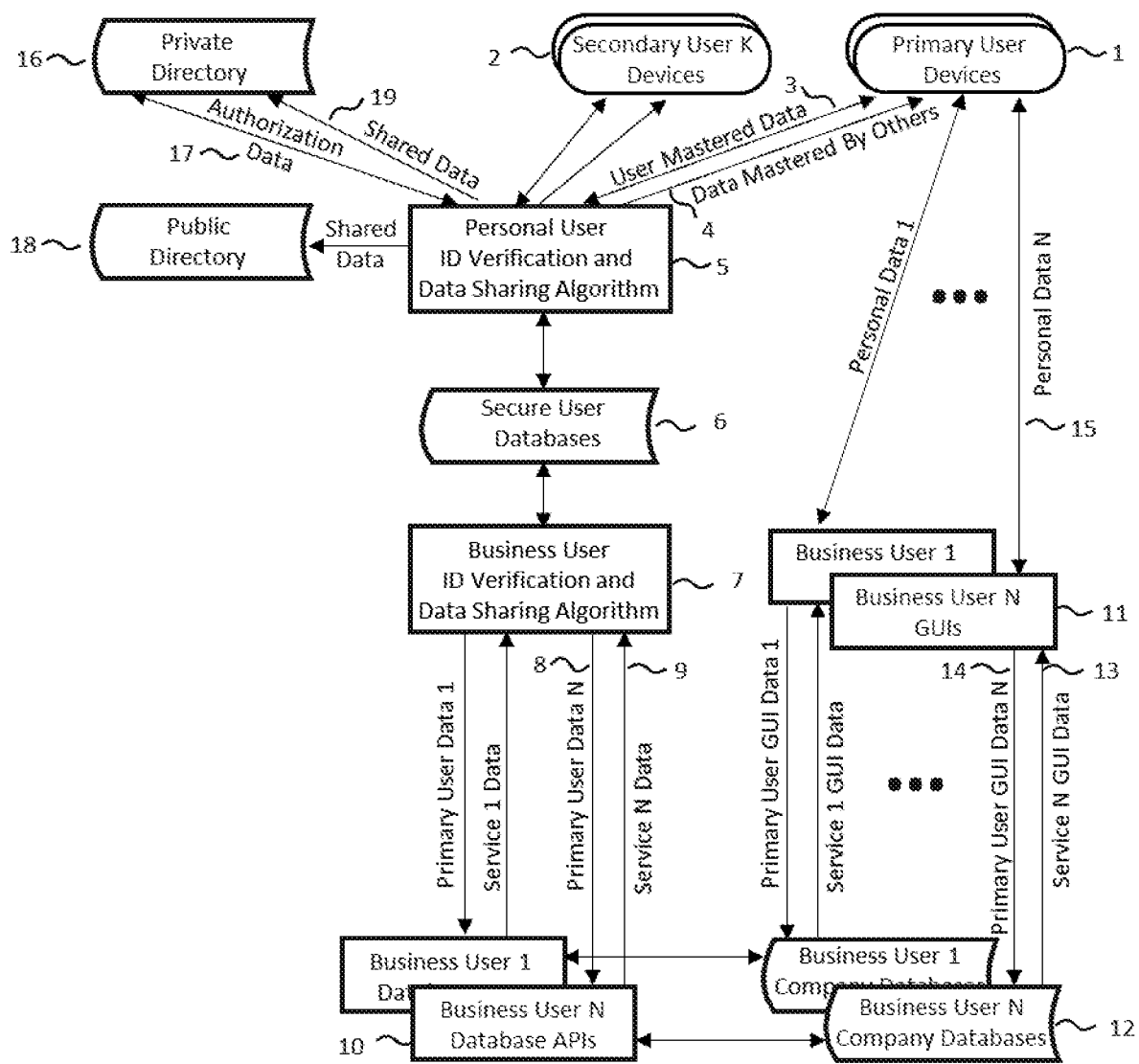
FIG. 3 shows a diagram of the flow and control of data for establishing private and public directories for authorized sharing of personal information.

FIG. 3 shows a method for users and business users to make certain personal or business data public through one or more private directories such as private directory 16 or one or more public directories such as public directory 18. In the case of public directories, the type of data that can be shared may be restricted to certain data fields. The example private directory 16 is so designated because users or business users are allowed to share data 19 to that directory only after the entity managing the private directory has established authorization criteria to verify the participants qualifications by exchanging authorization data 17 which authorizes the sharing of certain portions of their information. Examples of private directories include directories of users belonging to a specific organization and/or having specific credentials and or other conditional qualifiers; or business users of a certain expertise and/or within a certain geographical area and/or other conditional qualifiers. In each case the user or business user has either requested to join and been authorized to do so by the private directory manager criteria or the private directory manager has requested that the user or business user participate by sharing certain information and the user or business user has authorized sharing certain data fields of their personal data with that directory.

Since the date in private directories can contain contact information and be available to a large number of users and/or business users, the data sharing system described herein can require directory contacts only through the system using user's unique IDs. This allows the system to monitor certain contact behavior of users or business users or respond to one or more contacted users or business users to establish automatic quarantines of users or business users who abuse the directory system. Any user sharing data with a directory may also specify which data field values are shared and the shared data field values may be a subset of all possible data fields authorized for that directory.

As mentioned, FIG. 3 also shows a public directory that user's or business users can choose to share their information with. These directories are established by one or more users or business users, but are open to all users and business users and do not require specific authorization by meeting another user's or business user's criteria to share their data. Choosing to share contact information in this type of directory carries some risk as exposing contact information can lead to spamming or phishing of information from the directory members. As with private directories, the data sharing system described herein can monitor certain contact behavior of users or business users or respond to one or more contacted users or business users to establish automatic quarantines of users or business users who abuse the directory system.

The aforementioned system taken in its entirety and in its novel parts has the ability to greatly enhance the quality of life for individuals, the operating efficiency of corporate entities and to improve society in general since information needed to receive or provide services in the conduct of business can be automatically extracted or provided with greater authority and accuracy than doing so manually. However, it should also be apparent that the adoption of such a system on a large scale including nationally, internationally or even globally must be done in a way that protects the privacy and quality of life of every individual participating in the system. To this end, the system provides for the secure communication and encryption of the user's information and in one embodiment of the present invention, the secure communication encryption and/or the data storage encryption is done using encryption and decryption methods rendering the primary user's personal data and data sharing authorizations to only be accessible by the primary user such that no other entity can access the primary user's data except as authorized by the user.

As shown in FIG. 4, the contents of a user device encrypted database such as the device J encrypted database 31 may include one or more of the following items in addition to other items:

Primary user ID 201—The unique identifier of the primary user

Device ID 202—The identifier unique within all of the primary user's devices for the primary user's device J All field names list 203—A list of all the primary user's database field names contained within the primary user's relational database superset as it resides in the cloud except as modified by device J prior to a device J sync event.

All attributes table 204—A table of all attribute field names and associated attribute field values for each database field within the primary user's relational database superset as it resides on the cloud except as modified by device J prior to a device J sync event. Note that the cloud database also contains all attribute fields and associated values PLUS most data field data, except the data sharded to alternate devices and those existing in other user's and business user's encrypted databases not duplicated for storage efficiency. But although device J contains all attribute fields and associated values it typically only contains a subset of the actual field data.

Field group names table 205—For all field group names, a list of data field names included in each group Device cached data groups list 206—The field data cashed to this device identified by the field group name. Note that field group names can be overlapping, meaning the same field name can be listed in multiple data groups, but only one copy of the field data associated with the field name needs to be cached.

Device primary user verification data sets 207—The 'golden' verification data used to verify the primary user's identity to access the database on device J. Said data Includes one or more of passwords, biometrics, allowed access locations, two factor access methods, allowed access times, etc.

Device change table 208—A table of database data fields or attribute fields that have changed since the last synchronization event—last sync time, field name, old value, new value, time of change, ID of entity and ID of device making the change.

Master Summary Table 209—For every MasterID/FieldGroupName combination a data set including the time and data of the following: if/when primary user requested, when master offered, when primary user accepted/rejected, update type (ask, on access or scheduled interval or date), cascaded share type (never or always or ask or ask after N shares or ask after M share levels), change retention period.

Share Summary Table 210—For every ShareWithID/FieldGroupName combination a data set including the time and data of the following: if/when primary user offered, when sharer requested, when primary user accepted/rejected, update type (ask, on access, or scheduled), cascaded share type (never or always or ask or ask after N shares or ask after M share levels), and cascaded share level.

Device cached field data table 211—The actual relational database field data names and values cached on device J.

For the device change table 208, note that pending changes from other devices will not be reflected until sync of device J with the primary user's cloud database that includes the changes initiated by the primary user on all other primary user devices that have synced to the cloud. Also note that this change table becomes empty after sync but the cloud database may keep record of all changes by accumulating the change lists to create a change history back to the retention date specified by the primary user or master of a particular data field.

For the Master Summary Table 209, The MasterID is the unique identifier of the source sharing or mastering the data and the FieldGroupName is the name of the field group being shared or mastered. The field 'if/when primary user requested' records when the primary user requested the secondary user or business user to be the sharer or master of that particular data group. The 'when master offered' field records when the secondary user or business user offered to be the sharer or master of that particular data group. The 'when primary user accepted/rejected' field records whether the user accepted or rejected the offer for the other entity to be the source of the data and when that acceptance or rejection occurred. The 'update type' field records the update method, either 'ask'-always ask for an update, 'on access'—automatically update when the primary user accesses the data field, or 'scheduled interval or date'—which may be a repeating period for update or a sequence of dates for update. The 'cascaded share type' indicates how the data is to be shared, and may have values of 'always'—there is no limit or authorization required for the subsequent sharing of the data (though all cascaded sharing can be recorded as a combination of the primary users share summary table and cascaded share summary tables where the same data has been shared with other users and business users), 'ask'—any subsequent sharing of the data must be authorized by the user or business user sourcing the data, 'ask after N shares'—which allows 'always' sharing up to N times then reverts to 'ask', or 'ask after M levels'—which allows 'always' sharing up to M cascaded levels then reverts to 'ask'. The change retention period is the period of time that any changes to the shared group field data values or field attributes of the shared data will be retained. Note that data field groups shared or mastered with the primary user are in this table and the table is common to the cloud database after sync. Also note that data field groups mastered by the primary user are included in this table and that this table is mastered by the system (users and business users cannot change this table, only request changes)

For the Share Summary Table 210, the ShareWithID is the unique identifier of the entity the primary user is sharing the data with and the FieldGroupName is the name of the field group being shared by the primary user. If the primary user offers to share a field group, then the time and date of that offer is recorded in the 'if/when primary user offered' field. If a secondary user or business user requests that primary user data be shared, then the time and date of that request is stored in the 'when sharer requested field'. The accept/reject status and date and time of acceptance or rejection of the request to share is stored in the 'when primary user accepted/rejected' field. The update type indicates the update method, either 'ask'—always ask for an update, 'on access'—auto-matically update when the shared with entity accesses the data field, or 'scheduled'—which is a repeating period for update or a sequence of dates for update. The 'cascaded share type' indicates how the data is to be shared, either 'always'—there is no limit or authorization required for the subsequent sharing of the data (though all cascaded sharing is recorded in a combination of the primary users share summary table and cascaded share summary tables where the same data has been shared with other users and business users), 'ask'—any subsequent sharing of the data must be authorized by the user or business user sourcing the data, 'ask after N shares'—which allows 'always' sharing up to N times then reverts to 'ask', or 'ask after M levels'—which allows 'always' sharing up to M cascaded levels then reverts to 'ask'. The cascaded share level records the level of shares from the original share that the primary user has received the data share from. Note that only data field groups mastered by the primary user will have a cascaded share type specified by the primary user. Data field groups mastered by others but shared by the primary user will repeat the cascaded share type specified by the master. Also note that this table is mastered by the system (users and business users can't change this table, only request changes).

The system also provides for, at a user's authenticated request, a clean data wipe of a portion of or all of the user's data stored in the cloud and/or one or more user devices as well as a single data restore from one of a user's devices or an aggregate data restore from two or more user devices. The ability to completely wipe data is useful to allow a user to have all data on their private devices only, or to wipe data from a lost device when it connects to the cloud or otherwise receives such a request.

It should also be apparent that because the system allows business users to request the sharing of certain information from users of the system to qualify them for receipt of certain goods or services, that the potential for immoral discrimination exists. Such immoral discrimination would include the denial of services based on ethnicity, gender, or religious beliefs and any implementation of the system described herein should avoid such discrimination whether recognized by governing laws or not.

What is claimed is:

1. A method for providing secure sourcing of, access to, and storage of personal data in user databases, the method comprising:

accepting user input from one or more user devices to create a unique user identifier for each user;

collecting and storing associated user or device data or both the associated user and device data from the one or more user devices to be used for secure user identification or user and device identification;

securely identifying a user before allowing the user to establish new data groups of one or more data fields and associated attributes of each data field or group, one or more of the attributes defining one or more sources of the data and another one or more of the attributes specifying sharing of the data in the data group with other users, wherein the establishment of new data groups includes defining new fields, groups or attributes, selecting from predefined fields, groups or attributes, or providing data values for data fields or attributes;

aggregating the data groups and associated data fields and the attributes established by the one or more user devices associated with a primary user's identifier into a database accessible by a primary user from one or more primary user devices, and all or portions of the database accessible by at least one or more secondary users through one or more secondary user devices;

securely identifying the one or more secondary users before allowing the one or more secondary users to perform two or more of the following;

accepting requests originated by the primary user for the secondary user to source by generating primary user database data or to access one or more primary user database data groups, initiating requests to the primary user to source by generating secondary user database data or to access one or more secondary user database data groups, or sourcing or accessing data within one or more primary user data groups;

wherein said primary user is a personal or business user;

wherein said one or more secondary users are personal or business users, each functioning as primary users of their own databases;

wherein the data is stored unencrypted, or in one or more encrypted formats or a combination of unencrypted and encrypted formats;

wherein the establishment of data groups and updates of data in the data groups is facilitated by the creation of change lists including the user identifier of the owner of the database being altered, the name of the data field or group being changed, the changed value or values, and the time the change was made;

wherein the time of change is used to prioritize the changes to be made either with or without the primary user's confirmation to make the changes; and wherein a history of changes is either not retained or retained for a predetermined length of time for different data groups.

2. The method cited in claim 1 wherein data security is enhanced by use of one or more of;

database encryption in one or more encryption formats, data sharding of the database into one or more separate databases, only storing portions of the aggregated data on the primary user's devices, or having communication between the primary user's and secondary user's devices or software processes performed over encrypted communication links.

3. The method cited in claim 1 wherein the primary user authorizes one or more secondary users to access one or more primary user data groups in one or more of the following ways;

one time, or a predetermined number of times, or an unlimited number of times, with the secondary user's further sharing of the primary user data groups with other secondary users authorized by the primary user in one or more of the following ways;

no additional sharing, sharing by request and subsequent denial or authorization by the primary user, a predetermined number of direct additional shares each without further sharing, or a predetermined number of indirect additional shares each with a predetermined number of levels of indirect sharing.

4. The method cited in claim 3 wherein the authorizations and history of direct and indirect sharing of one or more groups of the primary user's data are available for review by the primary user for modification to authorize additional sharing, or to revoke existing authorization of one or more shares wherein the revocation of authorization includes the option to automatically delete the shared data from the secondary user databases.

5. The method cited in claim 1 wherein the verification of a user's identity includes different levels for different groups of data, each verification level consisting of one or more of the following verification criteria:

matching of a password previously entered by or generated for the users, matching of one or more biometric patterns unique to and previously provided by the user including fingerprints, external facial parameters, internal eye parameters, permanent artificial markings, matching of a unique code sent to one or more of the user's personal devices or other devices authorized by the user, and sent by one or more of email to computing devices and email, text messages or phone calls to mobile phones, matching the user's two dimensional or three dimensional geographic locations previously authorized, or matching the times of attempted access to preauthorized time of day limits;

wherein the matching is done by comparing unencrypted patterns, encrypted patterns, or both unencrypted and encrypted patterns.

6. The method cited in claim 1 wherein certification by one or more third party certification services is required to perform one or more of; creating the user's unique identifier, sourcing of one or more data groups, or sharing of one or more data groups; said one or more third parties being other trusted users or certification services and said certification being stored as one or more of the following;

a data field, a data field attribute, a data group, or a data group attribute.

7. The method cited in claim 1 wherein the database stored on any of the primary user's devices is a subset of all the primary user's data, said data subset being the same or different for each device and steps to securely identify the user are the same or different for each of the user's devices.

8. The method cited in claim 1 wherein the one or more business users are one or more employees of one or more business users or one or more employment positions of one or more business users.

9. The method cited in claim 1 wherein the data field attributes include one or more of; a field name, field data master address, field data allocated size, field data cached address, source identifier, source's authorization for the primary user to share, time the data was last verified, time the data was last changed, and time the authorizations were last changed.

10. The method cited in claim 1 wherein the change lists also contain for each data field or data group being changed either of the user identifier of the user originating the requested change, the device identifier of the device used to request the change, or both the user identifier and the device identifier.

11. The method cited in claim 1 wherein the change lists contain a set of conditions that must be met prior to the changes taking effect,
wherein the conditions include
a Boolean combination of one or more matches between current data values and their predefined match values.

12. The method cited in claim 1 wherein one or more of the users establish one or more directories with or without restrictions on the type of data that is published and the primary user is given the option to decline to participate, or to authorize publication or to share one or more of the primary user's data groups;
wherein the participation is either public and open to any user, private and the primary user must either be invited to participate or have their request to participate approved by the establishing user or one or more delegates of the establishing user, have data fields, groups, or attributes matching predetermined criteria, or a combination thereof.

13. The method cited in claim 1 wherein after verification of the primary user's identifier (ID) the user is given an option to request all data or a portion of the data be deleted from one or more primary user's devices or the cloud devices and has an option to restore all data or a subset of data from one or more primary user's devices or the cloud device or to restore all data or a subset of data from an aggregate of data from multiple user's devices.

14. A non-transitory computer readable media storing instructions to provide secure sourcing of, access to, and storage of personal data in user databases, that when the instructions are executed by one or more processors, cause one or more processors to:
accept user input from one or more user devices to create a unique user identifier for each user;
collect and store associated user or device data or both the associated user and device data from the one or more user devices to be used for secure user identification or user and device identification;
securely identify a user before allowing the user to establish new data groups of one or more data fields and associated attributes of each data field or group, one or more of the attributes defining one or more sources of the data and another one or more of the attributes specifying sharing of the data in the data group with other users, wherein the establishment of new data groups includes
defining new fields, groups, or attributes,
selecting from predefined fields, groups, or attributes, or
providing values for data fields or attributes;
aggregate the data groups and associated data fields and the attributes established by the one or more user devices associated with a primary user's identifier into a database accessible by a primary user from one or more primary user devices, and all or portions of the database accessible by at least one or more secondary users through one or more secondary user devices;
securely identify the one or more secondary users before allowing the one or more secondary users to perform two or more of the following;
accepting requests originated by the primary user for the secondary user to source by generating primary user database data or to access one or more primary user database data groups,
initiating requests to the primary user to source by generating secondary user database data or to access one or more secondary user database data groups, or
sourcing or accessing data within one or more primary user data groups;
wherein said primary user is a personal or business user;
wherein said one or more secondary users are personal or business users, each functioning as primary users of their own databases;
wherein the data is stored unencrypted, or in one or more encrypted formats or a combination of unencrypted and encrypted formats;
wherein the establishment of data groups and updates of data in the data groups is facilitated by the creation of change lists including the user identifier of the owner of the database being altered, the name of the data field or group being changed, the changed value or values, and the time the change was made;
wherein the time of change is used to prioritize the changes to be made either with or without the primary user's confirmation to make the changes; and
wherein a history of changes is either not retained or retained for a predetermined length of time for different data groups.

15. The non-transitory computer readable media cited in claim 14 wherein data security is enhanced by use of one or more of;
database encryption in one or more encryption formats,
data sharding of the database into one or more separate databases,
only storing portions of the aggregated data on the primary user's devices, or
having communication between the primary user's and secondary user's devices or
software processes performed over encrypted communication links.

16. The non-transitory computer readable media cited in claim 14 wherein the primary user authorizes one or more secondary users to access one or more primary user data groups in one or more of the following ways;
one time, a predetermined number of times, or an unlimited number of times, with the secondary user's further sharing of the primary user data groups with other secondary users authorized by the primary user in one or more of the following ways;
no additional sharing, sharing by request and subsequent denial or authorization by the primary user, a predetermined number of direct additional shares each without further sharing, or a predetermined number of indirect additional shares each with a predetermined number of levels of indirect sharing.

17. The non-transitory computer readable media cited in claim 16 wherein the authorizations and history of direct and indirect sharing of one or more groups of the primary user's data are available for review by the primary user for modification to authorize additional sharing or to revoke existing authorization of one or more shares wherein the revocation of authorization includes the option to automatically delete the shared data from the secondary user databases.

18. The non-transitory computer readable media cited in claim 14 wherein the verification of a user's identity includes different levels for different groups of data, each verification level consisting of one or more of the following verification criteria:
matching of a password previously entered by or generated for the user,
matching of one or more biometric patterns unique to and previously provided by the user including fingerprints, external facial parameters, internal eye parameters, permanent artificial markings, matching of a unique code sent to one or more of the user's personal devices or other devices authorized by the primary user, and sent by but not limited to one or more of email to computing devices and email, text messages or phone calls to mobile phones, matching the user's two dimensional or three dimensional geographic locations previously authorized; or matching the times of attempted access to preauthorized time of day limits;

wherein the matching is done by comparing unencrypted patterns, encrypted patterns, or both of encrypted or unencrypted patterns.

19. The non-transitory computer readable media cited in claim 14 wherein certification by one or more third party certification services is required to perform one or more of; creating the user's unique identifier, sourcing of one or more data groups, or sharing of one or more data groups; said one or more third parties being other trusted users or certification services and said certification being stored as one or more of the following; a data field, a data field attribute, a data group, or a data group attribute.

20. The non-transitory computer readable media cited in claim 14 wherein the database stored on any of the primary user's devices is a subset of all the primary user's data, said data subset being the same or different for each device and steps to securely identify the user are the same or different for each of the user's devices; and wherein the one or more business users are one or more employees of one or more business users or one or more employment positions of one or more business users.

21. The non-transitory computer readable media cited in claim 14 wherein the change lists also contain for each data field or data group being changed one or more of:

the user identifier of the user originating the requested change, the device identifier of the device used to request the change, or a set of conditions that must be met prior to the changes taking effect, said conditions being a Boolean combination of one or more matches between data values and their predefined match values.

22. The non-transitory computer readable media cited in claim 14 wherein one or more of the users establish one or more directories with or without restrictions on the type of data that is published and the primary user is given the option to decline participation, or to authorize publication or to share one or more of the primary user's data groups;

wherein the participation is either public and open to any user, private and the primary user must either be invited to participate or have their request to participate approved by the establishing user or one or more delegates of the establishing user, have data fields or groups or attributes matching predetermined criteria, or a combination thereof.

\* \* \* \* \*